United States Patent [19]

Lowe

[11] 4,176,819

[45] Dec. 4, 1979

[54] PORTABLE FISHING ROD HOLDER

[76] Inventor: Joe A. Lowe, 2437 Cherokee La., Winston-Salem, N.C. 27103

[21] Appl. No.: 861,346

[22] Filed: Dec. 16, 1977

[51] Int. Cl.² ............................................. A01K 97/10
[52] U.S. Cl. .................................... 248/513; 248/520; 248/530
[58] Field of Search .................. D6/125; D22/13, 22; 43/21.2; 211/60 R, 60 A, 60 M, 60 G, 62, 64, 68, 69, 69.1; 248/511, 512, 513, 519, 520, 528, 529, 530, 531, 532, 533, 156, 91

[56] References Cited

U.S. PATENT DOCUMENTS

| | | | |
|---|---|---|---|
| D. 179,525 | 1/1957 | Porter | 248/513 X |
| D. 239,015 | 3/1976 | Stout | 43/21.2 X |
| 1,654,876 | 1/1928 | Hemming | 248/533 |
| 2,322,600 | 6/1943 | Stahler | 248/531 |
| 2,815,863 | 12/1957 | Larson | 211/60 R |
| 2,854,147 | 9/1958 | Derr | 248/513 X |
| 2,877,828 | 3/1959 | Barnette | 248/156 X |
| 2,934,298 | 4/1960 | Aleskin | 248/513 X |
| 2,952,432 | 9/1960 | Valdez | D22/13 X |
| 3,164,185 | 1/1965 | Ingoldt | 211/60 G X |
| 3,966,051 | 6/1976 | Hollister et al. | 211/60 G X |

FOREIGN PATENT DOCUMENTS 50011   3/1935  Denmark ................................. 248/513
14448  of 1895  United Kingdom .................. 211/60 R

*Primary Examiner*—Lawrence J. Staab
*Attorney, Agent, or Firm*—Wigman & Cohen

[57] ABSTRACT

A portable holder for one or more fishing rods is disclosed and comprises two or more rectangular plates fixed in vertically spaced, parallel relation with respect to one another by means of an elongate shaft which is pointed at its free end to provide easy penetration into the earth at a shore fishing location or the like. The uppermost plate or plates is provided with a pair of through bores positioned apart a given spacing to either side of the shaft axis. The lowermost plate is provided with a pair of blind bores arranged at a closer spacing to the shaft axis than the through bores of the uppermost plate or plates such that fishing rods supported in the holder are inclined outwardly at an angle with respect to the shaft axis. Preferably, the holder is formed of plastic or wood and may be integrally molded or assembled from its component parts.

7 Claims, 5 Drawing Figures

PORTABLE FISHING ROD HOLDER

BACKGROUND OF THE INVENTION

The present invention relates to fishing implements and more particularly to a portable fishing rod holder for supporting one or more fishing rods.

A search of the prior art failed to uncover any prior art reference which discloses the fishing rod holder of the present invention. A number of prior art patents were uncovered which disclose a variety of fishing rod holder and support devices. The following is a listing of the prior art patents uncovered during the aforementioned search:

U.S. Pat. No. 567,084
U.S. Pat. No. 1,435,085
U.S. Pat. No. 2,160,499
U.S. Pat. No. 2,448,752
U.S. Pat. No. 2,596,403
U.S. Pat. No. 2,674,426
U.S. Pat. No. 2,680,924
U.S. Pat. No. 2,877,828
U.S. Pat. No. 4,017,998

It will be apparent from the above-listed patents that the fishing art has not been responsive to the need for a simple fishing rod holder suitable for effectively supporting a pair of fishing rods or poles of various designs. Typically, the prior art devices are characterized by a number of relatively movable components, detachable parts and fasteners which are highly susceptible to malfunction, breakage, loss or misplacement. Thus, a primary drawback of the prior art fishing rod holders and one suspected reason for the lack of any significant commerical success for such fishing rod holders is their relative complexity of design. Such complexity results in a rather expensive product which the average fisherman is unwilling to expend. Moreover, many of the prior art devices are cumbersome and unwieldy and are not suited for ready transportation, for example, in a fishing tackle box.

SUMMARY AND OBJECTS OF THE INVENTION

In view of the aforementioned limitations and shortcomings of the prior art fishing rod holder devices, as well as other disadvantages not specifically mentioned above, it should be apparent that there still exists a need in the art for a portable fishing rod holder which is characterized by the combined advantages of a simple, lightweight design, economical construction, the absence of any moving parts and, furthermore, which is particularly adapted for ease of use, as well as for easy transportability in a fishing tackle box. It is, therefore, a primary objective of this invention to fullfil this need by providing a compact portable fishing rod holder comprised of two or more rod-receiving parallel plates fixed in axially spaced relation along an earth-penetrating shaft.

More particularly, it is an object of this invention to provide a fishing rod holder which includes a pointed shaft having an upper rectangular plate or plates affixed thereto with spaced through bores for receiving the handles of a pair of fishing rods and a lower plate affixed to the shaft at a spacing below the upper plate or plates, which lower plate has blind bores in which the ends of the fishing rod handles are adapted to be supported.

It is another object of this invention to provide a fishing rod holder which is adapted to support a pair of fishing rods in a substantially vertical plane in inclined relation to each other so as to avoid interference between the reels and running gear of the fishing rods.

Briefly described, the aforementioned objects are accomplished according to the invention by a fishing rod holder comprised of preferably two spaced rectangular plates integrally formed with or affixed to an elongated shaft pointed at one end for penetrating the earth at a shore fishing location. The uppermost plate is provided with a pair of circular openings or through bores spaced a given distance from each other and symmetrically located to either side of the shaft axis. The lowermost plate has a pair of circular blind bores also symmetrically arranged to either side of the shaft axis but spaced closer to each other than the through bores of the upper plate so that fishing rods disposed in the holder will be inclined away from each other to avoid interference therebetween.

In one embodiment of the invention, the fishing rod holder is integrally formed of a plastic material by a conventional molding process. According to another embodiment of the invention, the plates and shaft are individually formed of wood, plastic or metal and are assembled together by means of cement, adhesives, welding or the like. In this latter embodiment, the plates and shaft are preferably provided with interengaging ribs and grooves.

With these and other objects, advantages and features of the invention that may become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
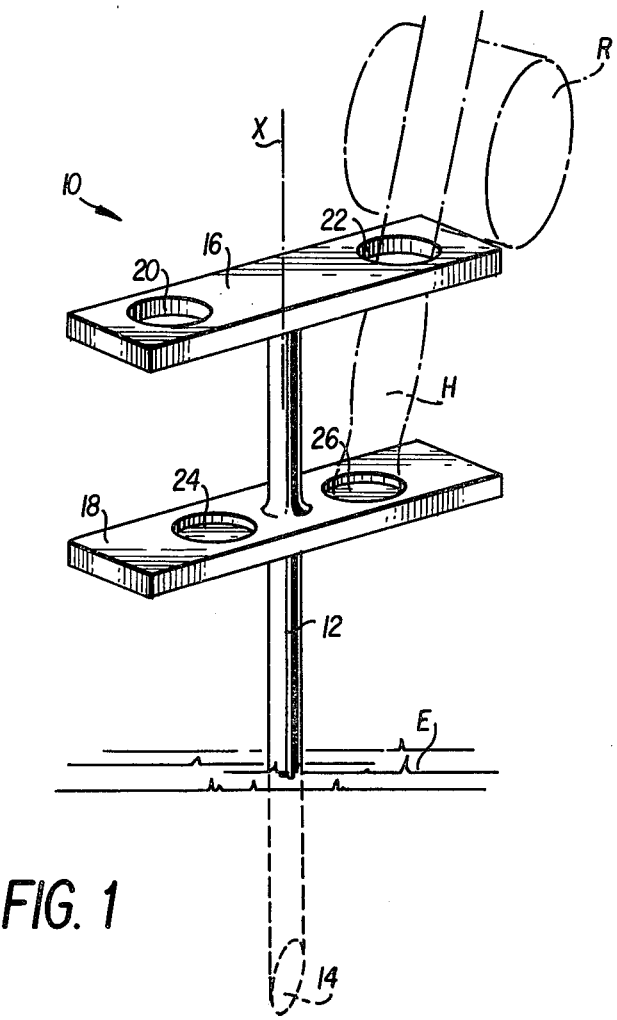
FIG. 1 is a perspective view of one embodiment of the fishing rod holder of the invention showing a fishing rod disposed therein.

Referring now in detail to the drawings, there is illustrated in FIG. 1 one embodiment of the fishing rod holder of the present invention which is designated generally by reference numeral 10. The holder 10 is integrally formed by molding from a plastic material and includes an elongated shaft 12 having a sharpened or pointed free end 14 which is shown penetrating the earth E as it would be positioned during use. A pair of rectangular plates including an upper plate 16 and lower plate 18 extend transversely from the shaft 12 in spaced relation to each other. Upper plate 16 is provided with a pair of circular openings or through bores 20, 22 symmetrically located to either side of the axis X of shaft 12. Lower plate 18 has two blind circular bores 24, 26 similarly symmetrically arranged with respect to the shaft 12, but at a closer spacing to each other than the bores 20, 22.

As shown in phantom lines in FIG. 1, a fishing rod R is disposed in the holder 10 with the handle H thereof extending through bore 22 and having its end resting in and supported by the blind bore 26. The difference in spacing of the bores 22 and 26 from the axis of shaft 12 causes the rod R to be inclined outwardly relative to the shaft. This arrangement helps to avoid interference between the rods and facilitates the placement and removal of two fishing rods in the holder. It will also be appreciated that the tips of a pair of fishing rods disposed in the holder 10 will be spaced apart a substantial distance so that entanglement of the fishing lines is prevented. If desired, of course, the holder 10 may be utilized to support only a single fishing rod as shown in FIG. 1.

Figure 2:
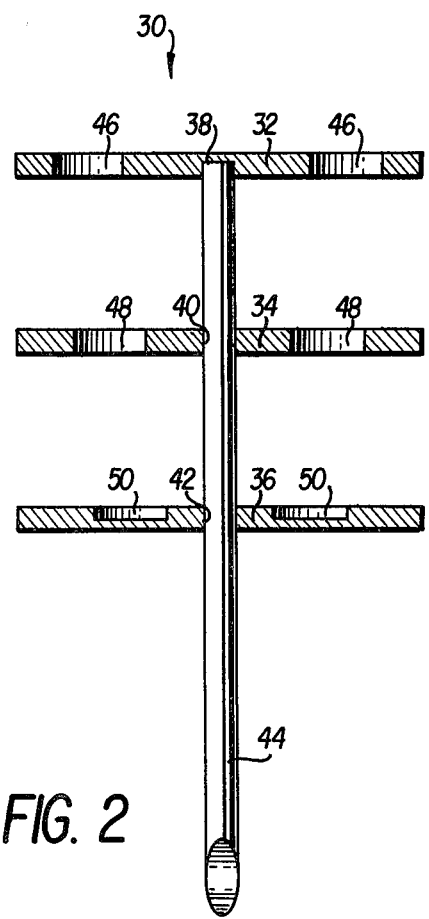
FIG. 2 is a side view, partly in cross-section, showing an alternate embodiment of the invention.

FIG. 2 illustrates an alternate embodiment of the invention wherein the components are individually fabricated of, for example, wood, plastic or metal and are assembled into the fishing rod holder designated generally by reference numeral 30. Holder 30 includes an upper plate 32, intermediate plate 34 and lower plate 36 which are secured by means of central bores 38, 40, 42 in spaced relation to each other along a pointed shaft 44. The bores 40 and 42 are through bores and bore 38 is blind as shown in FIG. 2. Upper and intermediate plates 32, 34 are provided with circular through bores 46 and 48 and lower plate 36 is provided with blind bores 50. The bores 46, 48 and 50 are differently spaced from the axis of shaft 44 in a manner similar to and for the purposes described above in connection with the embodiment of FIG. 1. The intermediate plate 34 is particularly useful for preventing dislodgement of the fishing rod handle from the blind bores 50 in the lower plate 36.

Figure 3A:
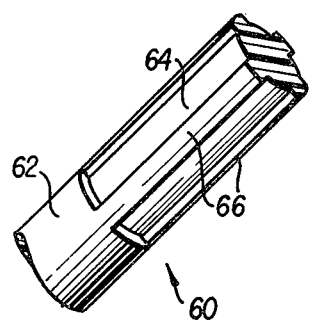
FIGS. 3A–3C are fragmentary detail views showing the manner of interconnection between the plates and shaft of the fishing rod holder of the invention.
Figure 3B:
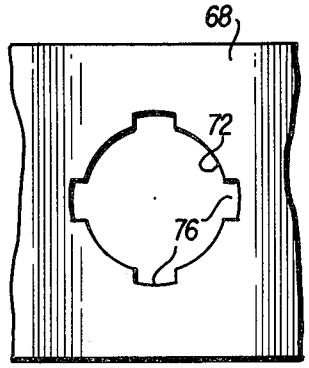
Figure 3C:
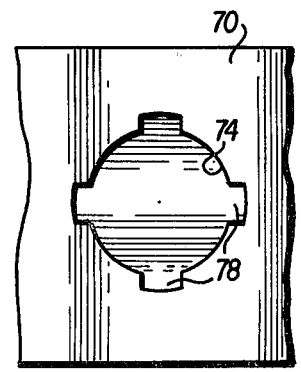

Depending on the material from which the holder 30 is fabricated, the plates may be secured to the shaft by any suitable means; in the case of (1) plastic material, by a solvent cement or adhesive; (2) metal material, by welding, soldering or brazing; (3) wood material, by glue. A particularly effective way of providing a rigid and secure connection between the shaft and plates of the fishing rod holder 30 is shown in FIGS. 3A–3C. In FIG. 3A, a partly shown shaft 60 has a first diameter portion 62 corresponding to the earth-penetrating end of the shaft and a second, reduced diameter portion 64 from which radially extends a plurality of longitudinal ribs 66. The fragmentary plate 68 shown in FIG. 3B corresponds, for example, to plate 34 or 36 of holder 30 and the fragmentary plate 70 shown in FIG. 3C corresponds to plates 32 of holder 30. In this instance, however, the shaft-receiving through bore 72 and blind bore 74 are provided with radial grooves 76, 78 complementary to the ribs 66 of shaft 60. Interengagement of the ribs 66 and grooves 76, 78 advantageously provides secure anti-rotative interlocking between the plates and shaft and the same are further made fast to each other by the bonding means mentioned above.

In addition, the fishing rod holder 10 or 30 could alternatively be constructed to accept a single fishing rod R by eliminating the portions of plates 16 and 18 extending to the left as viewed in FIG. 1 or the portions of plates 32, 34, 36 extending to the left in FIG. 2. In these cases, the shafts 12 and 44, respectively, would be arranged adjacent a terminal edge of the plates.

From the foregoing description, it will be apparent that the present invention provides an extremely simple and economical device for holding one or a pair of fishing rods so that the fisherman may otherwise occupy himself with other tasks. The present invention likewise provides a particularly advantageous holder for accommodating a ZEBCO-type spinning reel in widespread and common use.

Although only preferred embodiments are specifically illustrated and described herein, it would be possible, for example, to construct a fishing rod holder for three or more rods simply by extending the plates or by making the plates oval or circular. In addition, it is also within the scope of the invention that the ribbed portion of the shaft could comprise one, two or three ribs for interengaging the shaft and plates, instead of four as disclosed.

It will be appreciated that many other modifications and variations of the present invention are possible in light of the above teachings and within the purview of the appended claims without departig from the spirit and intended scope of the invention.

What I claim is:

1. A fishing rod device adapted to support a pair of fishing rods in a manner such that the fishing rods are inclined relative to one another comprising an elongate shaft having a longitudinal axis and a pointed free end which is adapted to penetrate the earth, an upper and a lower plate rigidly affixed to said shaft in axially spaced relation to each other along a portion of said shaft opposite said free end, said upper plate having at least two through bores substantially symmetrically arranged to each side of the axis of said shaft, said through bores being spaced apart a given distance, said lower plate having at least two blind bores opening toward said upper plate and substantially symmetrically arranged to each side of the axis of said shaft, said blind bores being spaced apart a distance less than said given distance whereby said pair of fishing rods are inclined outwardly relative to the axis of said shaft and are maintained spaced apart from each other and from said shaft;

an intermediate plate affixed to said shaft between said upper and lower plates, said intermediate plate having at least two through bores substantially symmetrically arranged to each side of the axis of said shaft, the through bores of said intermediate plate being spaced apart a distance less than said given distance and greater than the distance between said blind bores; and said lower and intermediate plates each having a central bore through which said shaft extends and said upper plate having a central blind bore in which an end of said shaft is secured.

2. A fishing device adapted to support a pair of fishing rods in a manner such that the fishing rods are inclined relative to one another comprising an elongate shaft having a longitudinal axis and a pointed free end which is adapted to penetrate the earth, an upper and a lower plate rigidly affixed to said shaft in axially spaced relation to each other along a portion of said shaft opposite said free end, said upper plate having at least two through bores substantially symmetrically arranged to each side of the axis of said shaft, said through bores being spaced apart a given distance, said lower plate having at least two blind bores opening toward said upper plate and substantially symmetrically arranged to each side of the axis of said shaft, said blind bores being spaced apart a distance less than said given distance whereby said pair of fishing rods are inclined outwardly relative to the axis of said shaft and are maintained spaced apart from each other and from said shaft; and said shaft having a plurality of radial ribs extending longitudinally along said shaft portion, said lower plate including a central through bore having radial grooves complementary to the ribs on said shaft, the ribbed portion of said shaft extending interengagingly through said central through bore, said upper plate including a central blind bore having radial grooves complementary to the ribs on said shaft, the ribbed portion of said shaft extending interengagingly into said central blind bore.

3. The device according to claim 2, wherein said plates and shaft are integrally formed of a molded plastic material.

4. The device according to claim 2, wherein said plates are rectangular and said bores are circular.

5. The device according to claim 2, including an intermediate plate affixed to said shaft between said upper and lower plates, said intermediate plate having at least two through bores substantially symmetrically arranged to each side of the axis of said shaft, the through bores of said intermediate plate being spaced apart a distance less than said given distance and greater than the distance between said blind bores, said intermediate plate further including a central through bore having radial grooves complementary to the ribs on said shaft, the ribbed portion of said shaft extending interengagingly through the central through bore of said intermediate plate.

6. The device according to claim 2, wherein said plates and shaft are rigidly affixed together by means of an adhesive.

7. The device according to claim 2, wherein said plates and shaft are formed of a material from the group of wood, metal and plastic.

* * * * *